US007018050B2

(12) United States Patent
Ulichney et al.

(10) Patent No.: US 7,018,050 B2
(45) Date of Patent: Mar. 28, 2006

(54) SYSTEM AND METHOD FOR CORRECTING LUMINANCE NON-UNIFORMITY OF OBLIQUELY PROJECTED IMAGES

(75) Inventors: Robert Alan Ulichney, Stow, MA (US); Rahul Sukthankar, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/657,527

(22) Filed: Sep. 8, 2003

(65) Prior Publication Data

US 2005/0052618 A1 Mar. 10, 2005

(51) Int. Cl.
*G03B 21/00* (2006.01)
*G03B 21/14* (2006.01)
*H04N 5/64* (2006.01)
*G09G 5/02* (2006.01)
*G06K 15/00* (2006.01)

(52) U.S. Cl. ........................ 353/69; 353/121; 353/122; 348/744; 345/698; 345/596; 358/3.13; 382/275

(58) Field of Classification Search .................... 349/8, 349/10, 42, 58, 61, 110, 158, 161, 201, 5; 348/744, 745, 750, 766, 771, 746, 747; 359/619, 359/858; 353/69, 70, 30, 31, 99, 119, 37, 353/78, 84, 33, 34, 38, 101, 81, 94, 121, 353/122; 345/698, 596; 358/3.13; 382/275
See application file for complete search history.

(56) References Cited

U.S. PATENT DOCUMENTS

| | | | | |
|---|---|---|---|---|
| 6,483,537 | B1 * | 11/2002 | Mayer et al. | 348/180 |
| 6,520,647 | B1 * | 2/2003 | Raskar | 353/70 |
| 6,816,187 | B1 * | 11/2004 | Iwai et al. | 348/187 |
| 6,817,721 | B1 * | 11/2004 | Ulichney et al. | 353/69 |
| 6,921,172 | B1 * | 7/2005 | Ulichney et al. | 353/69 |
| 2004/0061838 | A1 * | 4/2004 | Mochizuki et al. | 353/69 |
| 2004/0141157 | A1 * | 7/2004 | Ramachandran et al. | 353/70 |

* cited by examiner

*Primary Examiner*—W. B. Perkey
*Assistant Examiner*—Rochelle Blackman

(57) ABSTRACT

A system and method corrects luminance non-uniformity caused by images being obliquely projected onto a screen. A camera is used to record the geometry of the obliquely displayed image. Utilizing this recorded geometry, a homography is then derived that maps pixels between the projector's coordinate system and the screen's coordinate system. Utilizing the homography, the projector pixel that attends to the largest projected area on the screen is identified. Next, the ratio of each pixel's projected area to the largest projected area is computed. These ratios are then organized into an attenuation array that is used to produce "corrected" luminance information from input image data. The projector is then driven with the "corrected" luminance information.

13 Claims, 7 Drawing Sheets

SYSTEM AND METHOD FOR CORRECTING LUMINANCE NON-UNIFORMITY OF OBLIQUELY PROJECTED IMAGES

BACKGROUND OF THE INVENTION

1. Field of the Invention

The present invention relates to electronic imaging systems and, more specifically, to correcting projected or displayed images.

2. Background Information

There are a wide-variety of digital image projectors that are currently available. Most digital projectors include a video decoder and a light engine. The video decoder converts video data received by the projector, e.g., from the display connection of a personal computer (PC), into pixel and color data. The pixel and color data is then supplied to the light engine, which converts that data into the actual projected image. The light engine includes a lamp, optics and logic for manipulating the light in order to generate the pixels and color.

There are three different types of technologies utilized by the light engines of today's projectors: Liquid Crystal Display (LCD), Digital Light Processing (DLP) and Liquid Crystal on Silicon (LCOS). An LCD light engine breaks down the light from a lamp into red, green and blue components. Each color is then polarized and sent to one or more liquid crystal panels that turn the pixels on and off, depending on the image being produced. An optic system then recombines the three color signals and projects the final image to a screen or other surface.

DLP technology was developed by Texas Instruments, Inc. of Dallas, Tex. A DLP light engine directs white light from a lamp onto a color wheel producing red, green, blue and white light. The colored light is then passed to a Digital Micromirror Device (DMD), which is an array of miniature mirrors capable of tilting back-and-forth on a hinge. Each mirror corresponds to a pixel of the projected image. To turn a pixel on, the respective mirror reflects the light into the engine's optics. To turn a pixel off, the mirror reflects the light away from the optics.

A LCOS light engine combines LCD panels with a low cost silicon backplane to obtain resolutions that are typically higher than LCD or DLP projectors. The LCOS light engine has a lamp whose light is sent to a prism, polarized, and then sent to a LCOS chip. The LCOS chip reflects the light into the engine's optics where the color signals are recombined to form the projected image.

Oftentimes, a projector is positioned relative to the screen or other surface onto which the image is to be displayed such that the projector's optical axis is not perpendicular in all directions to the screen. Sometimes, for example, even though the projector is set up directly in front of the screen, the optical axis is nonetheless angled up (producing an image above the projector) or down (producing an image below the projector), such as from a ceiling mounted projector. The resulting image that is projected onto the screen has a trapezoidal shape, and the distortion is known as the keystone-effect. In other arrangements, the optical axis of the projector is not only angled up or down, but is also angled to the left or right. Here, the resulting image is a polygon, and the distortion is known as the oblique-effect. In addition to being non-rectangular in shape, the projected images also suffer from variations in the luminance or brightness level. Specifically, those portions of the projected image that are closer to the projector appear brighter, while those portions that are further away appear dimmer. Such non-uniformities in luminance further reduce the quality of the projected image.

Some projectors include mechanisms for correcting keystone distortion in the vertical direction only. These mechanisms typically achieve this correction by one of two ways so that all lines appear to have the same length: (1) increase the subsampling of higher lines, or (2) scaling scan lines. These mechanisms do not, however, correct for the non-uniformity in luminance that also occurs when the projector is positioned such that the screen is not perpendicular to the projector's optical axis. The luminance non-uniformity of an obliquely projected image can become more pronounced when a "composite" image is created by multiple projectors whose individual obliquely projected images are tiled together, e.g., in a 4 by 5 pattern, to form the composite image.

Accordingly, a need exists for correcting luminance non-uniformity resulting from the optical axis of a projector being non-perpendicular to the screen.

SUMMARY OF THE INVENTION

Briefly, the present invention is directed to a system and method for correcting luminance non-uniformity caused by obliquely projected images. To correct luminance non-uniformity, an attenuation array is created. The array is configured with attenuation values that are applied to input image data during operation of the projector so as to generate corrected image data. This corrected image data is then used to drive the projector such that the entire displayed image has the same luminance as the dimmest point. More specifically, a camera is used to capture the geometry of the obliquely displayed image. A homography is then computed that maps pixels between the projector's coordinate system and the screen's coordinate system. Utilizing the homography, the projector pixel that subtends to the largest projected area on the screen is identified. Next, the ratio of each pixel's projected area to the largest projected area is computed. These ratios are then organized into the attenuation array.

In operation, the input luminance information for each pixel location is received by a run-time system that performs a look-up on the attenuation array to retrieve the attenuation value for the respective pixel location. The attenuation value and input luminance information are then multiplied together to generate a corrected luminance value for the respective pixel location. This corrected luminance value is then used to drive the projector, resulting in a displayed image that is uniform in luminance. In the illustrative embodiment, the run-time system is further configured to correct the geometric distortion of the obliquely projected image so as to produce a rectangular corrected image on the screen.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
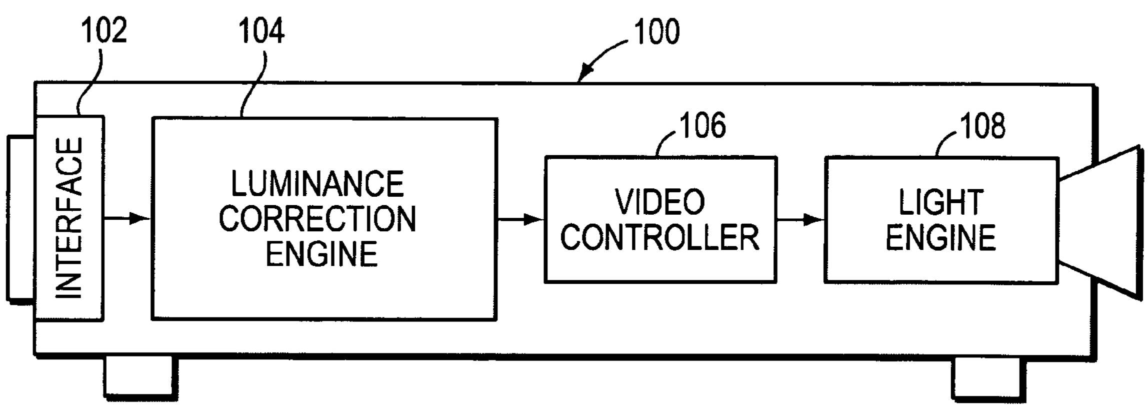
FIG. 1 is a highly schematic, partial block diagram of a digital projector in accordance with the present invention.

FIG. 1 is a highly schematic, partial block diagram of a digital projector 100 in accordance with the present invention. Projector 100 has an interface 102 for receiving input video data from a source, such as a personal computer (PC), a DVD player, etc. In accordance with the present invention, the projector 100 is configured to include a luminance correction engine 104 that receives the picture element (pixel) data from interface 102. As described herein, engine 104 modifies the received pixel data to correct for luminance non-uniformities that may result when the projector 100 is setup such that it generates an oblique or keystone image. Projector 100 further includes a video controller 106 that receives the "corrected" pixel data from engine 104, and performs some additional processing on that data, such as synchronization, linearization, etc. The pixel data is then sent to a light engine 108 for projecting an image to be displayed based on the pixel data received from the video controller 106.

The light engine 108 may use any suitable technology, such as one or more Liquid Crystal Display (LCD) panels, Digital Light Processing (DLP) or Liquid Crystal on Silicon (LCOS). Suitable digital projectors for use with the present invention include the HP (Compaq iPAQ) Model MP 4800 or the HP Digital Projector Model xb31 both from Hewlett Packard Co. of Palo Alto, Calif. Nonetheless, those skilled in the art will recognize that the present invention may be used with other projectors, including those using other types of image generation technologies.

It should be understood that pixel or image information may be in various formats. For example, with bi-tonal image information, there is only one component for representing the image, and that component has two shades. Typically, the shades are black and white although others may be used. With monochrome image information, there is one component used to define the luminance of the image. Monochrome images typically have black, white and intermediate shades of gray. Another format is color, which, in turn, can be divided into two sub-groups. The first sub-group is luminance/chrominance in which the images have one component that defines luminance and two components that together define hue and saturation. The second sub-group is RGB. A color image in RGB format has a first component that defines the amount of red (R) in the image, a second component that defines the amount of green (G) in the image, and a third component that defines the amount of blue (B) in the image. Together these three color components define the luminance and chrominance of the image. For ease of description, the terms "luminance" and "level" are used herein to refer to any such type of is image systems or formats, i.e., bi-tonal, monochrome or color.

Figure 2:
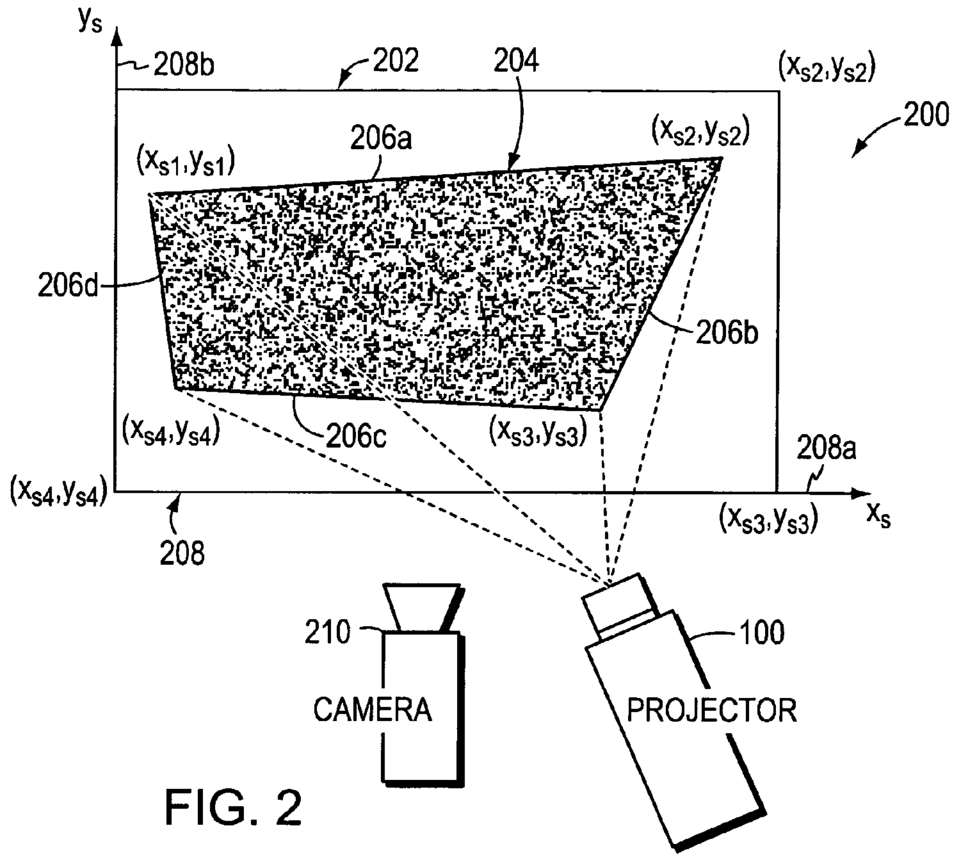
FIGS. 2, 5 and 11 are highly schematic illustrations of projection arrangements.

FIG. 2 is a highly schematic illustration of a projection arrangement 200. Projection arrangement 200 includes a projector, such as projector 100, and a surface or screen 202 onto which an image 204 from projector 100 is displayed. The screen image 204 has four sides 206*a–d*. In the illustrative projection arrangement 200 of FIG. 2, the projector's optical axis (not shown) is not perpendicular to the screen 202. As a result, screen image 204 is an oblique image, i.e., none of its sides 206*a–d* are parallel to each other. A screen coordinate system 208 is preferably imposed, at least logically, on the screen 202. The screen coordinate system 208 includes an x-axis, $x_s$, 208*a* and a y-axis, $y_s$, 208*b*. Accordingly, every point on screen 202, including the points making up screen image 204, can be identified by its corresponding screen coordinates, $x_s,y_s$. For example, the four corners of the screen image 204 can be identified by their corresponding screen coordinates, e.g., $x_{s1},y_{s1}$, $x_{s2},y_{s2}$, $x_{s3},y_{s3}$, and $x_{s4},y_{s4}$.

Figure 3:
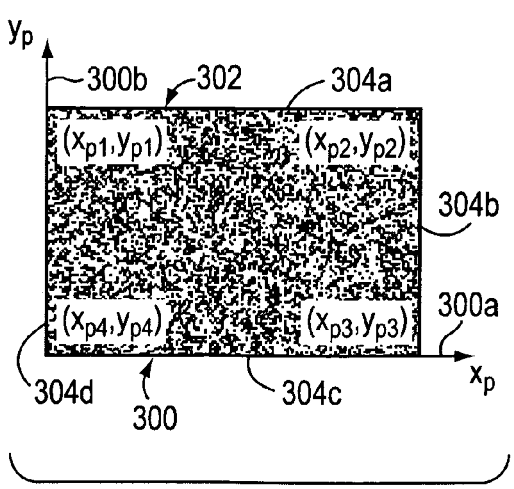
FIGS. 3, 6 and 12 are highly schematic illustrations of projector coordinate systems.

FIG. 3 is a highly schematic illustration of a projector coordinate system 300 that can be imposed, at least logically, on an image 302 being generated for display by the projector 100. The projector coordinate system 300 includes an x-axis, $x_p$, 300*a* and a y-axis, $y_p$, 300*b*. By definition, the projector coordinate system 300 is perpendicular in all directions to the projector's optical axis. Accordingly, from the point of view of the projector 100, as shown in FIG. 3, the image 302 that is being generated by the projector 100 is a rectangle. That is, projector-generated image 302 has four sides 304*a–d*, and each pair of opposing sides is parallel to each other. Furthermore, the four corners of the projector-generated image 302 can be identified by their projector coordinates, e.g., $x_{p1},y_{p1}$, $x_{p2},y_{p2}$, $x_{p3},y_{p3}$, and $x_{p4},y_{p4}$.

In order to generate a mapping between the screen coordinate system 208 and the projector coordinate system 300, a camera 210 (FIG. 2) is used to capture and record the geometry of the screen image 204. In a first embodiment of the present invention, the camera 210 is positioned such that its optical axis (not shown) is perpendicular to the screen 202 in all planes. As with the screen 202 and the projector 100, a camera coordinate system is also generated, at least logically.

Figure 4:
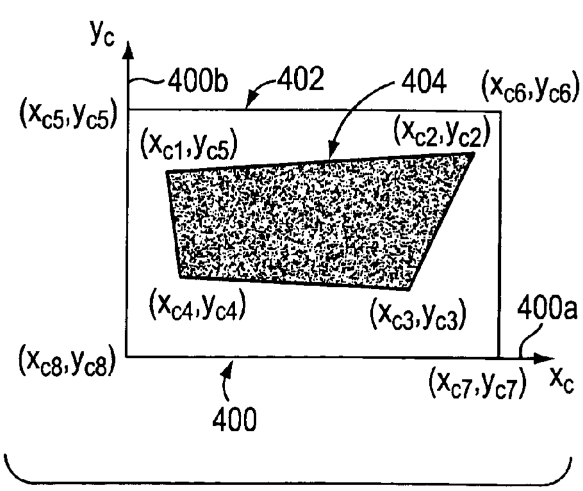
FIGS. 4 and 7 are highly schematic illustrations of camera coordinate system.

FIG. 4 is a highly schematic illustration of a camera coordinate system 400 that includes an x-axis, $x_c$, 400*a* and a y-axis, $y_c$, 400*b*. Defined within the camera coordinate system 400 is an image of the screen 402 as captured by the camera 210. Within the camera-screen image 402 is a camera-projection image 404 of the screen image 204 (FIG. 2) generated by the projector 100. Because the camera 210 has been positioned such that its optical axis is perpendicular to the screen 202 in all planes, the screen and camera coordinate systems 208 and 400, respectively, are equivalent to each other. Thus, the mapping between the projector coordinate system 300 and the camera coordinate system 400 is the same as the mapping between the projector coordinate system 300 and the screen coordinate system 208.

Suitable video cameras for use with the present invention include the Hitachi DZ-MV100A and the Sony DCR-VX2000, among others. That is, in a preferred embodiment, the camera utilized by the present invention is a low-cost, conventional digital video camera. Nonetheless, those skilled in the art will recognize that other cameras, including still digital cameras, may be used.

Generating the Homographies

Assuming that the optics of both the projector 100 and the camera 210 can be modeled as pinhole systems, then the mapping from the camera coordinate system 400 to the projector coordinate system 208 is given by the following equations:

$$x_c = \frac{(h_1 x_p + h_2 y_p + h_3)}{(h_7 x_p + h_8 y_p + h_9)} \qquad (1)$$

-continued $$y_c = \frac{(h_4x_p + h_5y_p + h_6)}{(h_7x_p + h_8y_p + h_9)} \quad (2)$$

where, $x_c, y_c$ and $x_p, y_p$ are corresponding points in the camera coordinate system 400 and the projector coordinate system 300, respectively, and $h_1$ through $h_9$ are the unknown parameters of the mapping from the projector coordinate system 300 to the camera coordinate system 400.

The values of $h_1$ through $h_9$ can be derived by causing the projector 100 to display at least four different points, whose coordinates in the projector coordinate system 300 are known, and determining where these points appear in the image(s) captured by the camera 210 relative to the camera coordinate system 400. These points can be displayed by projector 100 either individually in a sequence of images, or all together in a single image. For example, the projector 100 can be provided with input data that only causes the pixels corresponding to the four corners of the projector's displayable area or field to be illuminated, e.g., turned on. The same result can be achieved by projecting all of the pixels in the projector's displayable area, and identifying the corners of the resulting quadrilateral. The projected image(s) is capture by the camera 210 and the x,y coordinates in the camera coordinate system 400 of each point, i.e., each corner, is determined. This permits eight linear equations to be written, i.e., one for each of the x-coordinates of the four corners and one for each of the y-coordinates of the four corners. The eight equations are as follows:

$$x_{c1} = \frac{(h_1x_{p1} + h_2y_{p1} + h_3)}{(h_7x_{p1} + h_8y_{p1} + h_9)} \quad (3)$$

$$y_{c1} = \frac{(h_4x_{p1} + h_5y_{p1} + h_6)}{(h_7x_{p1} + h_8y_{p1} + h_9)} \quad (4)$$

$$x_{c2} = \frac{(h_1x_{p2} + h_2y_{p2} + h_3)}{(h_7x_{p2} + h_8y_{p2} + h_9)} \quad (5)$$

$$y_{c2} = \frac{(h_4x_{p2} + h_5y_{p2} + h_6)}{(h_7x_{p2} + h_8y_{p2} + h_9)} \quad (6)$$

$$x_{c3} = \frac{(h_1x_{p3} + h_2y_{p3} + h_3)}{(h_7x_{p3} + h_8y_{p3} + h_9)} \quad (7)$$

$$y_{c3} = \frac{(h_4x_{p3} + h_5y_{p3} + h_6)}{(h_7x_{p3} + h_8y_{p3} + h_9)} \quad (8)$$

$$x_{c4} = \frac{(h_1x_{p4} + h_2y_{p4} + h_3)}{(h_7x_{p4} + h_8y_{p4} + h_9)} \quad (9)$$

$$y_{c4} = \frac{(h_4x_{p4} + h_5y_{p4} + h_6)}{(h_7x_{p4} + h_8y_{p4} + h_9)} \quad (10)$$

Given eight equations and nine unknowns, the system is under specified. To determine the nine transform parameters $h_1$ through $h_9$, the eight equations are arranged into matrix form. Notably, the set of solutions for the nine transform parameters $h_1$ through $h_9$ are all within the same scale factor.

In the illustrative embodiment, the following matrix is generated from which the homography parameters $h_1$ through $h_9$ can be determined:

$$\begin{bmatrix} x_cw \\ y_cw \\ w \end{bmatrix} = \begin{bmatrix} h_1 & h_2 & h_3 \\ h_4 & h_5 & h_6 \\ h_7 & h_8 & h_9 \end{bmatrix} \begin{bmatrix} x_p \\ y_p \\ 1 \end{bmatrix} \quad (11)$$

Those skilled in the art will recognize that many techniques are available to solve for the eight transform parameters, such as singular value decomposition as described in Sukthankar, R., Stockton R., and Mullin M. "Smarter presentations: exploiting homography in camera-projector systems" Proceedings of International Conference on Computer Vision (2001), which is hereby incorporated by reference in its entirety.

Those skilled in the art will further recognize that instead of using four points from the projector coordinate system, four lines or other selections, such as illuminating the entire projection area, may be used.

As expressed in matrix form, the mapping is given by the following equation:

$$\begin{bmatrix} x_{p1} & y_{p1} & 1 & 0 & 0 & 0 & -x_{p1}x_{c1} & -y_{p1}x_{c1} & -x_{c1} \\ 0 & 0 & 0 & x_{c1} & y_{c1} & 1 & -x_{p1}y_{c1} & -y_{p1}y_{c1} & -y_{c1} \\ x_{p2} & y_{p2} & 1 & 0 & 0 & 0 & -x_{p2}x_{c2} & -y_{p2}x_{c2} & -x_{c2} \\ 0 & 0 & 0 & x_{c2} & y_{c2} & 1 & -x_{p2}y_{c2} & -y_{p2}y_{c2} & -y_{c2} \\ x_{p3} & y_{p3} & 1 & 0 & 0 & 0 & -x_{p3}x_{c3} & -y_{p3}x_{c3} & -x_{c3} \\ 0 & 0 & 0 & x_{c3} & y_{c3} & 1 & -x_{p3}y_{c3} & -y_{p3}y_{c3} & -y_{c3} \\ x_{p4} & y_{p4} & 1 & 0 & 0 & 0 & -x_{p4}x_{c4} & -y_{p4}x_{c4} & -x_{c4} \\ 0 & 0 & 0 & x_{c4} & y_{c4} & 1 & -x_{p4}y_{c4} & -y_{p4}y_{c4} & -y_{c4} \end{bmatrix} \begin{bmatrix} h_1 \\ h_2 \\ h_3 \\ h_4 \\ h_5 \\ h_6 \\ h_7 \\ h_8 \\ h_9 \end{bmatrix} = \begin{bmatrix} 0 \\ 0 \\ 0 \\ 0 \\ 0 \\ 0 \\ 0 \\ 0 \end{bmatrix}$$

where w is a scale factor similar to a normalizing constant. For each point $x_p$ and $y_p$, w is the third element in the vector that results from the matrix multiply. It is then used to find $x_c$ and $y_c$ by dividing the first and second elements of the resulting vector.

For ease of description, the three-by-three matrix containing the nine homography parameters $h_1$ through $h_9$ may be abbreviated as H. Furthermore, the parameters $h_1$ through $h_9$ that form the mapping from the projector coordinate system to the camera coordinate system may be abbreviated as ${}_pH_c$.

As the camera 210 was arranged with its optical axis perpendicular to the screen 202, the homography between the projector 100 and the screen 202, ${}_pH_s$, is the same as the homography between the projector 100 and camera 210, ${}_pH_c$, as computed above.

Those skilled in the art will recognize that a computer, such as a Compaq D315 business PC or a HP workstation zx2000, both of which are commercially available from Hewlett Packard Co., may be used to receive the pixel data from the captured images produced by camera 502, to average those images and to produce the resulting camera attenuation array. The computer may further be used to supply image data to the projector 100 to display the four or more pixels. More specifically, the computer, which has a memory and a processor, may include one or more software libraries containing program instructions for performing the steps of the present invention.

Figure 5:
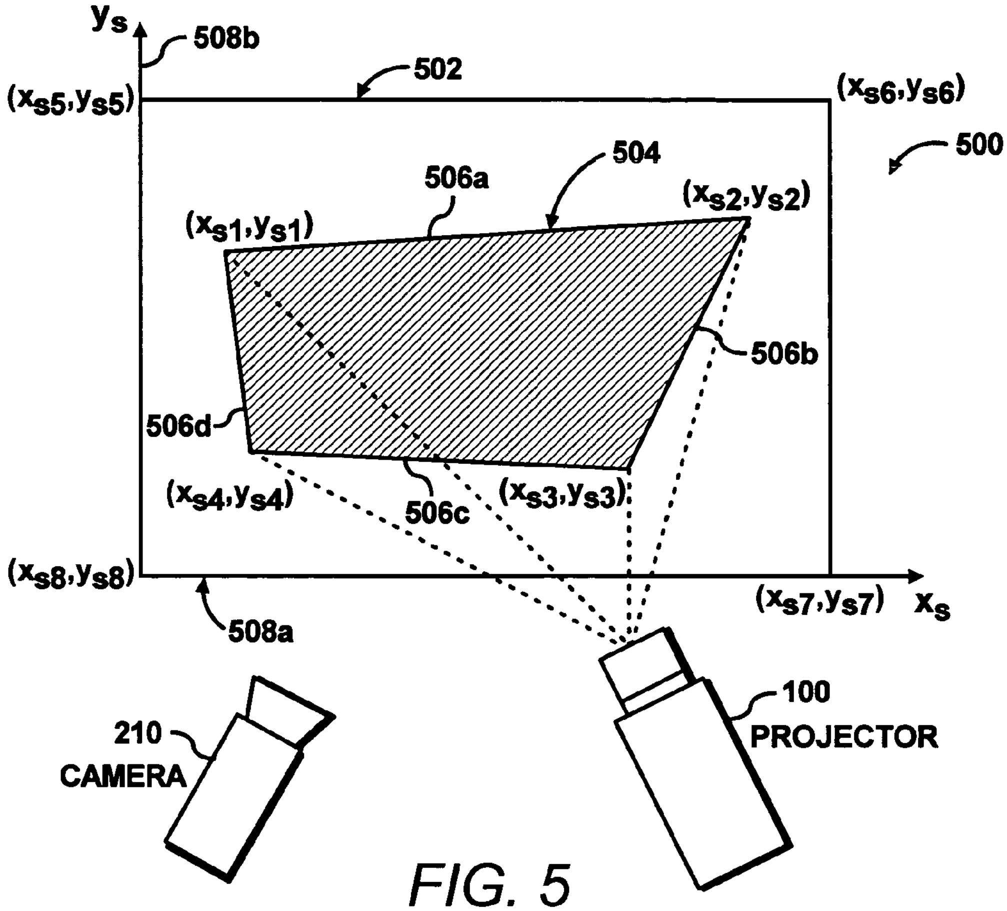

Suppose now that the camera 210 is positioned so that its optical axis is not perpendicular to the screen 202, as illustrated in the projection arrangement 500 of FIG. 5. In this case, the image of the screen 202 as captured by the camera 210 will not be a rectangle as was the case in FIG. 4. In particular, projection arrangement 200 includes a projector, such as projector 100, and a surface or screen 502 onto which an image 504 from projector 100 is displayed. The screen image 504 has four sides 506*a–d*. In projection arrangement 500, the projector's optical axis (not shown) is not perpendicular to the screen 502. As a result, screen image 504 is an oblique image, i.e., none of its sides 506*a–d* are parallel to each other. A screen coordinate system 508 is preferably imposed, at least logically, on the screen 502. The screen coordinate system 508 includes an x-axis, $x_s$, 508*a* and a y-axis, $y_s$, 508*b*. Accordingly, every point on screen 502, including the points making up screen image 504, can be identified by its corresponding screen coordinates, $x_s, y_s$. For example, the four corners of the screen image 504 can be identified by their corresponding screen coordinates, e.g., $x_{s5}, y_{s5}$, $x_{s6}, y_{s6}$, $x_{s7}, y_{s7}$, and $x_{s8}, y_{s8}$.

Figure 6:
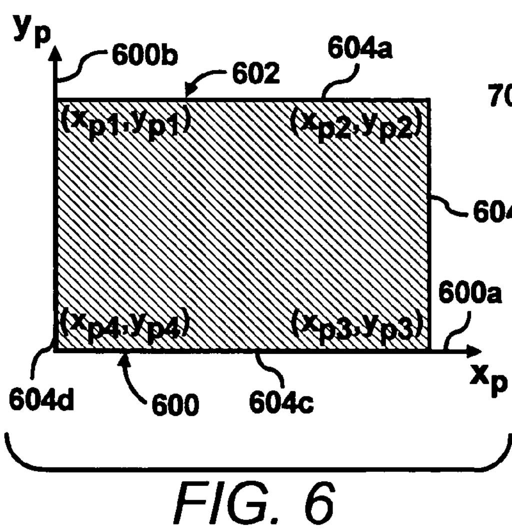

FIG. 6 is a highly schematic illustration of a projector coordinate system 600 that can be imposed, at least logically, on an image 602 being generated for display by the projector 100. The projector coordinate system 600 includes an x-axis, $x_p$, 600*a* and a y-axis, $y_p$, 600*b*. By definition, the projector coordinate system 600 is perpendicular in all directions to the projector's optical axis. Accordingly, from the point of view of the projector 100, as shown in FIG. 6, the image 602 that is being generated by the projector 100 is a rectangle. That is, projector-generated image 602 has four sides 604*a–d*, and each pair of opposing sides is parallel to each other. Furthermore, the four corners of the projector-generated image 602 can be identified by their projector coordinates, e.g., $x_{p1}, y_{p1}$, $x_{p2}, y_{p2}$, $x_{p3}, y_{p3}$, and $x_{p4}, y_{p4}$.

Figure 7:
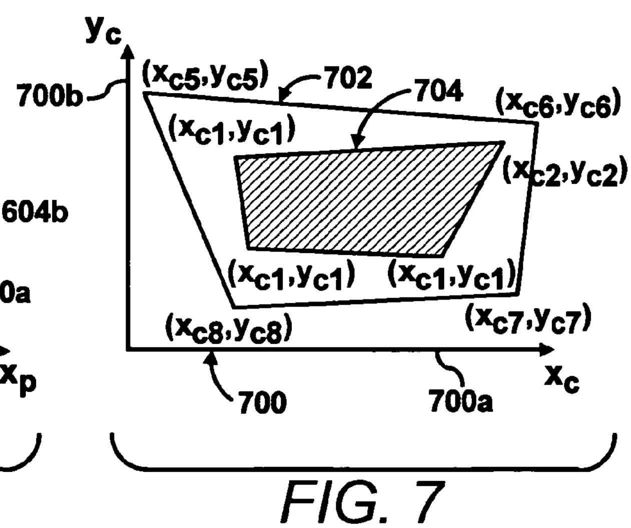

FIG. 7 a highly schematic illustration of a camera coordinate system 700 that includes an x-axis, $x_c$, 700*a* and a y-axis, $y_c$, 700*b*. Defined within the camera coordinate system 700 is an image of the screen 702 as captured by the camera 210. Within the camera-screen image 702 is a camera-projection image 704 of the screen image 504 (FIG. 5) generated by the projector 100. Because the camera 210 is also positioned obliquely relative to the screen 502 in this example, even the camera-screen image 702 is a polygon.

Because the camera 210 no longer "sees" an undistorted view of the screen 502, ${}_pH_s$ does not equal ${}_cH_p$, and thus ${}_pH_s$ cannot be calculated in a single step as was the case in the previously described example. Instead, in accordance with the present invention, the camera 210 is assumed to be able to view a rectangle having a known aspect ratio, which is the rectangle's width, i.e., its x-dimension, divided by its height, i.e., its y-dimension. The aspect ratio will typically be provided as an input. A suitable rectangle for consideration is the screen 202. To compute the mapping from the projector to the screen, ${}_pH_s$, a sequence of homographies are preferably composed as described below.

First, the mapping from the projector 100 to the camera 210, ${}_pH_c$, is decomposed into a mapping from the projector 100 to the screen 202, ${}_pH_s$, followed by a mapping from the screen 202 to the camera 210, ${}_sH_c$. The relationship among these mappings is given by the following equation:

$$ {}_pH_s = {}_sH_c^{-1}\,{}_pH_c \qquad (12)$$

The homographies on the right side of the equation can be determined from known point correspondences using the procedure described above. More specifically, with reference to FIGS. 3 and 5, the ${}_pH_c$ homography uses the four points defined by the projection area, as follows:

$x_{p1}, y_{p1}$ corresponds to $x_{c1}, y_{c1}$ $x_{p2}, y_{p2}$, corresponds to $x_{c2}, y_{c2}$ $x_{p3}, y_{p3}$ corresponds to $x_{c3}, y_{c3}$ $x_{p4}, y_{p4}$ corresponds to $x_{c4}, y_{cy}$ With reference to FIGS. 5 and 7, the ${}_sH_c$ homography uses the four points defined by the physical projection screen 202, as follows:

$x_{s5}, y_{s5}$ corresponds to $x_{c5}, y_{c5}$ $x_{s6}, y_{s6}$ corresponds to $x_{c6}, y_{c6}$ $x_{s7}, y_{s7}$ corresponds to $x_{c7}, y_{c7}$ $x_{s8}, y_{s8}$ corresponds to $x_{c8}, y_{c8}$ It has been recognized by the inventors that the exact dimensions of this rectangle do not need to be known. Only its relative dimensions are required, which may be given by the aspect ratio. That is, the four reference corners are given by the following x,y coordinates: (0, α), (1, α), (1,0) and (0,0), where a is the aspect ratio. Accordingly, substituting the screen's aspect ratio, α, gives the following:

$$(x_{s5}, y_{s5})=(0, 1) \qquad (13)$$

$$(x_{s6}, y_{s6})=(\alpha, 1) \qquad (14)$$

$$(x_{s7}, y_{s7})=(\alpha, 0) \qquad (15)$$

$$(x_{s8}, y_{s8})=(0, 0) \qquad (16)$$

To derive ${}_pH_c$, whose nine elements are arranged in the matrix order as in equation (11), the following system of equations is preferably solved:

$$\begin{bmatrix} x_{p1} & y_{p1} & 1 & 0 & 0 & 0 & -x_{p1}x_{c1} & -y_{p1}x_{c1} & -x_{c1} \\ 0 & 0 & 0 & x_{c1} & y_{c1} & 1 & -x_{p1}y_{c1} & -y_{p1}y_{c1} & -y_{c1} \\ x_{p2} & y_{p2} & 1 & 0 & 0 & 0 & -x_{p2}x_{c2} & -y_{p2}x_{c2} & -x_{c2} \\ 0 & 0 & 0 & x_{c2} & y_{c2} & 1 & -x_{p2}y_{c2} & -y_{p2}y_{c2} & -y_{c2} \\ x_{p3} & y_{p3} & 1 & 0 & 0 & 0 & -x_{p3}x_{c3} & -y_{p3}x_{c3} & -x_{c3} \\ 0 & 0 & 0 & x_{c3} & y_{c3} & 1 & -x_{p3}y_{c3} & -y_{p3}y_{c3} & -y_{c3} \\ x_{p4} & y_{p4} & 1 & 0 & 0 & 0 & -x_{p4}x_{c4} & -y_{p4}x_{c4} & -x_{c4} \\ 0 & 0 & 0 & x_{c4} & y_{c4} & 1 & -x_{p4}y_{c4} & -y_{p4}y_{c4} & -y_{c4} \end{bmatrix} \begin{bmatrix} h_{pHc1} \\ h_{pHc2} \\ h_{pHc3} \\ h_{pHc4} \\ h_{pHc5} \\ h_{pHc6} \\ h_{pHc7} \\ h_{pHc8} \\ h_{pHc9} \end{bmatrix} = \begin{bmatrix} 0 \\ 0 \\ 0 \\ 0 \\ 0 \\ 0 \\ 0 \\ 0 \end{bmatrix}$$

Likewise, to derive ${}_sH_c$, the following system of equations is preferably solved:

$$\begin{bmatrix} x_{p1} & y_{p1} & 1 & 0 & 0 & 0 & -x_{p1}x_{c1} & -y_{p1}x_{c1} & -x_{c1} \\ 0 & 0 & 0 & x_{c1} & y_{c1} & 1 & -x_{p1}y_{c1} & -y_{p1}y_{c1} & -y_{c1} \\ x_{p2} & y_{p2} & 1 & 0 & 0 & 0 & -x_{p2}x_{c2} & -y_{p2}x_{c2} & -x_{c2} \\ 0 & 0 & 0 & x_{c2} & y_{c2} & 1 & -x_{p2}y_{c2} & -y_{p2}y_{c2} & -y_{c2} \\ x_{p3} & y_{p3} & 1 & 0 & 0 & 0 & -x_{p3}x_{c3} & -y_{p3}x_{c3} & -x_{c3} \\ 0 & 0 & 0 & x_{c3} & y_{c3} & 1 & -x_{p3}y_{c3} & -y_{p3}y_{c3} & -y_{c3} \\ x_{p4} & y_{p4} & 1 & 0 & 0 & 0 & -x_{p4}x_{c4} & -y_{p4}x_{c4} & -x_{c4} \\ 0 & 0 & 0 & x_{c4} & y_{c4} & 1 & -x_{p4}y_{c4} & -y_{p4}y_{c4} & -y_{c4} \end{bmatrix} \begin{bmatrix} h_{sHc1} \\ h_{sHc2} \\ h_{sHc3} \\ h_{sHc4} \\ h_{sHc5} \\ h_{sHc6} \\ h_{sHc7} \\ h_{sHc8} \\ h_{sHc9} \end{bmatrix} = \begin{bmatrix} 0 \\ 0 \\ 0 \\ 0 \\ 0 \\ 0 \\ 0 \\ 0 \end{bmatrix}$$

Once these two homographies are solved, such as in the manner described above, ${}_pH_s$ can be obtained using equation (12) as also described above.

Generating the Attenuation Array

Assuming that each pixel is equally illuminated by the projector 100, the non-uniformity in luminance in the obliquely projected image 204 on screen 202 is related to the relative areas of the projected pixels on the screen. That is, pixels that subtend to a larger area, such as those pixels corresponding to screen coordinates, $x_{s1}, y_{s1}$ and $x_{s2}, y_{s2}$, appear dimmer, while pixels that subtend to a smaller area, such as those pixels corresponding to screen coordinates $x_{s3}, y_{s3}$ and $x_{s4}, y_{s4}$, appear brighter. To correct for luminance non-uniformities, the present invention preferably computes the ratio between the projected areas of different pixels. The ratio of the areas of two projected pixels may be given by the ratio of the Jacobean of the mapping, i.e., a matrix of partial derivatives. Considering the previously computed homographies, this ratio is given by the following equation:

$$\frac{S(x_{pi}, y_{pi})}{S(x_{pj}, y_{pj})} = \frac{|h_7 x_{pj} + h_8 y_{pj} + h_9|^3}{|h_7 x_{pi} + h_8 y_{pi} + h_9|^3} \quad (17)$$

where, $S(x_{pi}, y_{pi})$ is the area of the projected pixel at projector location $x_{pi}$, $y_{pi}$, $S(x_{pj}, y_{pj})$ is the area of the projected pixel at projector location $x_{pj}$, $y_{pj}$, and $h_7$, $h_8$ and $h_9$ are the homography parameters from the third row of the projector to screen homography matrix, ${}_pH_s$.

Given that the pixel that subtends to the largest projected area should appear the dimmest, an attenuation array is preferably generated that comprises the ratio between the projected area of each projector pixel and the largest projected area. To find the pixel that subtends to the largest projected area, the present invention preferably defines the following value, $w(x_p, y_p)$, for each projector pixel:

$$w(x_p, y_p) = |h_7 x_p + h_8 y_p + h_9| \quad (18)$$

With reference to equation (17), the projector pixel having the largest area will also have the smallest $w(x_p, y_p)$ value. Accordingly, the $w(x_p, y_p)$ value is computed for each projector pixel, and the smallest computed value of $w(x_p, y_p)$ is assigned to the variable $w_d$. Utilizing the computed value of $w_d$, the attenuation array, $a_o$, is then given by:

$$a_o(x_p, y_p) = \left[\frac{w_d}{w(x_p, y_p)}\right]^3 \quad (19)$$

The attenuation array, $a_o$, will have a value of "1" at the location of the dimmest pixel meaning that no luminance is taken away from this pixel, and a value between "0" and something less than "1" at every other pixel, meaning that the luminance of the other pixels is reduced accordingly.

For a projector 100 having a resolution of 768 by 1280, the attenuation array, $a_o$, will have 768×1280 or $9.8\times10^5$ correction values.

Figure 8:
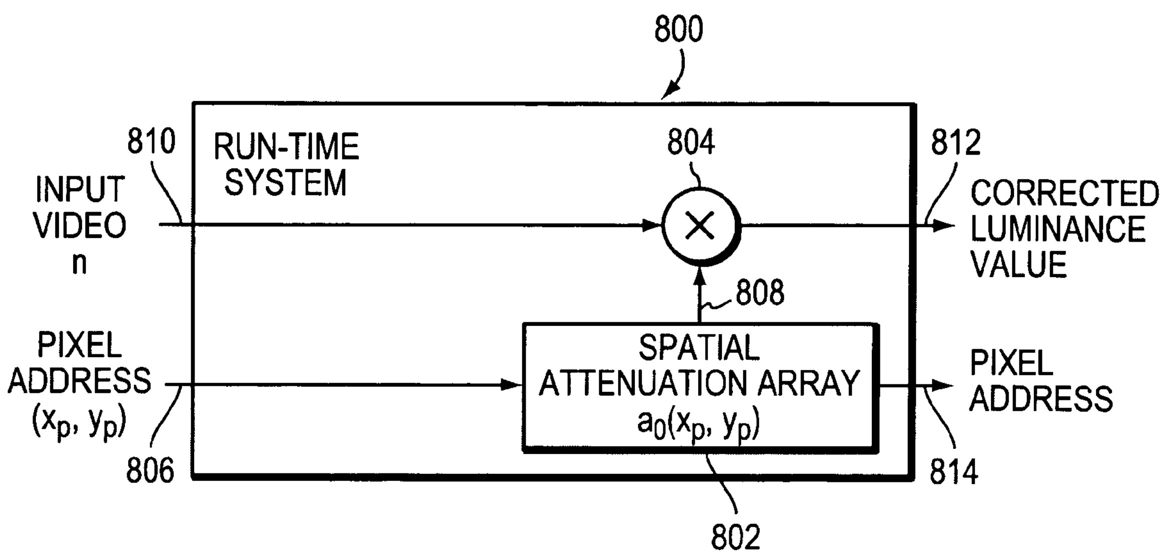
FIG. 8 is a highly schematic illustration of a run-time system in accordance with the present invention.

FIG. 8 is a highly schematic illustration of a preferred embodiment of a run-time system 800 in accordance with the present invention. The run-time system 800, which is preferably disposed within the luminance correction engine 104 (FIG. 1), includes a spatial attenuation array 802 and a multiplier logic circuit 804. The spatial attenuation array 802 receives the pixel address portion of the input image data as indicated by arrow 806 in projector space, i.e., $x_p$, $y_p$. Using the pixel address, a look-up is performed on the spatial attenuation array 802 to derive the correction value, e.g., 0.37, previously computed for that pixel address. The correction value, along with the luminance portion of the input image data, i.e., 125, are passed to the multiplier logic circuit 804, as indicated by arrows 808 and 810, respectively. The multiplier logic circuit 804 multiplies those two values together and the resulting "corrected" luminance level, e.g., 46, is supplied to the video controller 106 (FIG. 1) along with the corresponding pixel address information, as indicated by arrows 812 and 814, respectively. The "corrected" luminance level, e.g., 46, is ultimately used to drive the light engine 108, such that the oblique image 204 produced by the projector 100 on screen 202 is nonetheless uniform in luminance.

It will be understood to those skilled in the art that the luminance correction engine 104 and/or run-time system 800, including each of its sub-components, may be implemented in hardware through registers and logic circuits formed from one or more Application Specific Integrated Circuits (ASICs) or Field Programmable Gate Arrays (FPGAs), among other hardware fabrication techniques. Alternatively, engine 104 and/or run-time system 800 may be implemented through one or more software modules or libraries containing program instructions pertaining to the methods described herein and executable by one or more processing elements (not shown) of projector 100. Other computer readable media may also be used to store and execute these program instructions. Nonetheless, those skilled in the art will recognize that various combinations of software and hardware, including firmware, may be utilized to implement the present invention.

Extension to Other Luminance Correction Systems

The present invention may also be combined with other techniques for correcting luminance non-uniformity caused by other and/or additional factors.

For example, commonly owned, co-pending application Ser. No. 10/612,308, filed Jul. 2, 2003, titled "System and Method for Correcting Projector Non-uniformity", which is hereby incorporated in its entirety, discloses a system and method for correcting luminance non-uniformity caused by both internal projector non-uniformities as well as oblique image projections. That system utilizes a camera to capture a series of images produced by the projector in which each individual image has a uniform output level at all pixel locations. The image information captured by the camera is used to generate an attenuation array, which may be denoted as $a_p(x_p, y_p)$. If the projector is then moved to a new location relative to the screen or other surface, the process is repeated to generate a new attenuation array for use from this new projector position.

In a further embodiment of the present invention, the system and method of the present invention can be combined with the system and method of the application Ser. No. 10/612,308 to simplify the process of generating a new attenuation array whenever the projector is moved to a new location. More specifically, suppose that a first attenuation array, $a_p(x_p, y_p)$, is generated in accordance with the system and method of the application Ser. No. 10/612,308 for a first projector position relative to the screen. In addition, a first oblique attenuation array, $a_{o1}(x_p, y_p)$ is also generated in accordance with the present invention. Suppose further that the projector is then moved to a second location relative to the screen. With the projector at the second location, a second oblique attenuation array, $a_{o2}(x_p, y_p)$ is generated in accordance with the present invention. With the projector at the second location, the relative attenuation at each projector pixel address is given by the following equation:

$$\frac{a_{o2}(x_p, y_p) a_p(x_p, y_p)}{a_{o1}(x_p, y_p)} \quad (16)$$

This relative attenuation is preferably normalized by finding the largest value for the variable β from the following equation:

$$\beta = \max\left\{\frac{a_{o2}(x_p, y_p)a_p(x_p, y_p)}{a_{oI}(x_p, y_p)}\right\} \quad (17)$$

It should be understood that the largest value of β corresponds to the location of the dimmest pixel. Next, a composite attenuation array, $a'_p$ is normalized so that the dimmest pixel location has an attenuation value of "1.0", using the following equation:

$$a'_p = \frac{a_{o2}(x_p, y_p)a_p(x_p, y_p)}{\beta a_{01}(x_p, y_p)} \quad (18)$$

Figure 9:
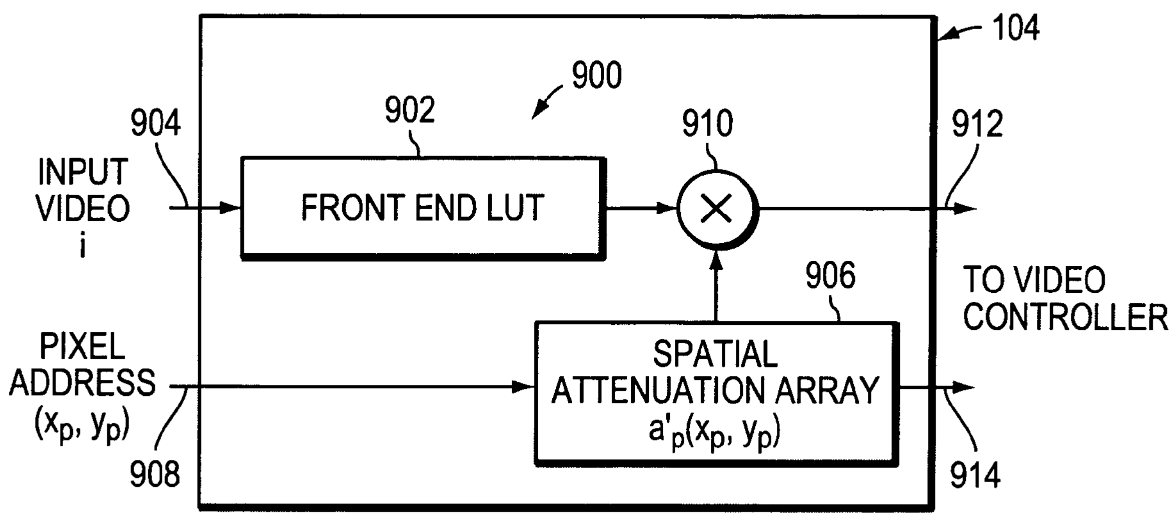
FIGS. 9 and 10 are highly schematic illustrations of run-time systems in accordance with other embodiments of the present invention.

FIG. 9 is a highly schematic illustration of a run-time system 900 in accordance with this second embodiment of the system. Run-time system 900 includes a front end look-up table (LUT) 902 that receives uncorrected input levels from interface 102 (FIG. 1) as indicated by arrow 904. Run-time system 900 further includes a spatial attenuation array 906 that receives the pixel addresses, in projector space, i.e., $x_p$, $y_p$, corresponding to the respective input levels being supplied to the front end LUT 902, as indicated by arrow 908. The run-time system 900 also includes multiplier logic 910 that receives the output of the front end LUT 902 and the spatial attenuation array 906 for each input level/x,y coordinate pair. The multiplier logic 910 multiplies those outputs together and the resulting "corrected" input level is supplied eventually to the light engine 108 along with the corresponding pixel address information, as indicated by arrows 912 and 914, respectively.

The attenuation array, $a'_p$, described above in accordance with equation (18), is loaded into spatial attenuation array 914. The front end LUT 902 is loaded in tho manner described in application Ser. No. 10/612,308. Thus, rather than use the camera to capture an image corresponding to each projector level with the projector positioned at the second location, the method of the present invention is used to generate an oblique attenuation array that is then combined with the two attenuation arrays previously computed for the projector when it was at the first location.

Commonly owned, co-pending application Ser. No. 10/612,309, filed Jul. 2, 2003, titled "System and Method for Increasing Projector Amplitude Resolution and Correcting Luminance Nonuniformity", which is hereby incorporated in its entirety, discloses a system and method for increasing a projector's apparent amplitude resolution as well as correcting luminance non-uniformity. It employs dithering to increase the projector's apparent amplitude resolution. In the same manner as previously described, when a projector is moved from a first location to a second location, the system and method of the present invention can be used to generate a composite attenuation array, $a'_p$, which can then be utilized with the invention of application Ser. No. 10/612,309.

Figure 10:
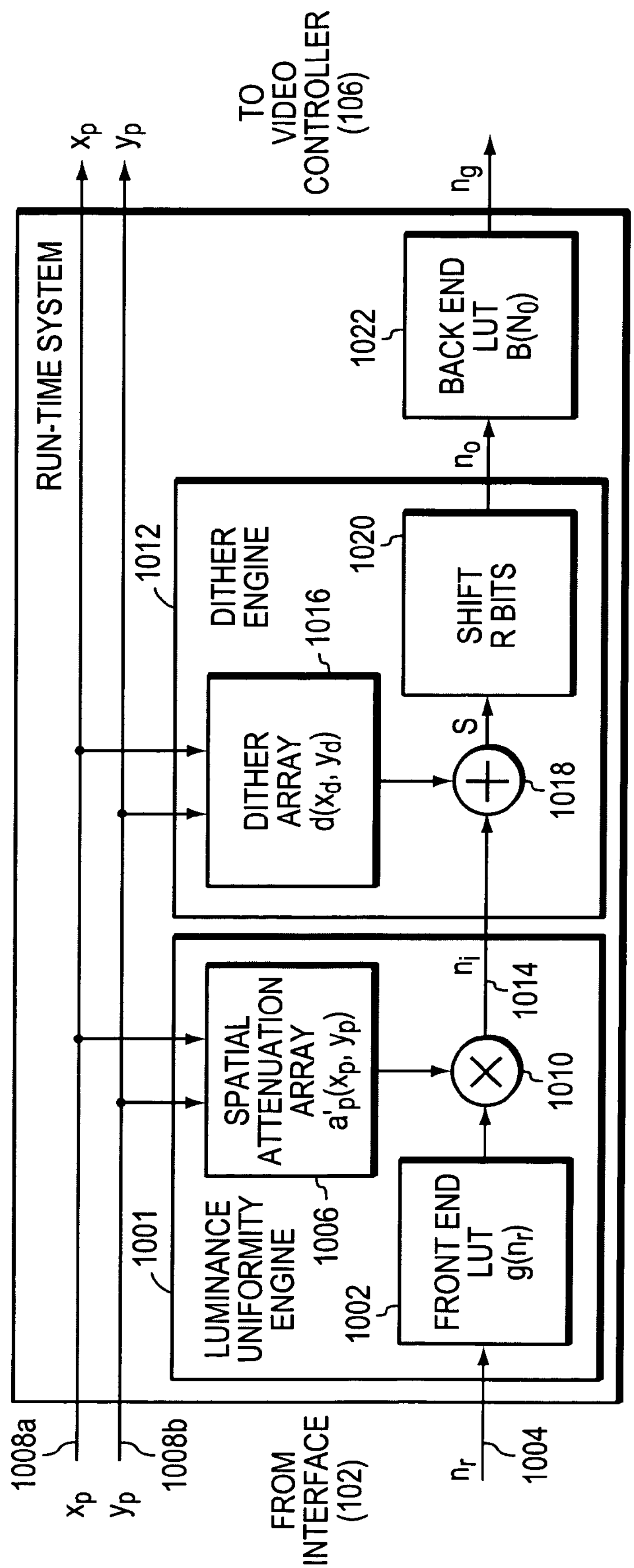

FIG. 10 is a highly schematic illustration of a run-time system 1000 in accordance with this third embodiment of the system. Run-time system 1000 includes a luminance uniformity engine 1001, a dither engine 1012 and a back-end look-up table 1022 that cooperate to process input image information so that the resulting image generated by projector 100 (FIG. 1) is uniform in luminance and appears to have been produced from a greater number of levels than the number of unique levels that the projector 100 is capable of producing. The luminance uniformity engine 1001 includes a front end look-up table (LUT) 1002 that receives an uncorrected, raw input level, $n_r$, from interface 102, as indicated by arrow 1004, and a spatial attenuation array 1006 that receives the pixel addresses, in projector space, i.e., $x_p$, $y_p$, as indicated by arrows 1008*a–b*, corresponding to the respective raw, input level $n_r$, received at the front end LUT 1002. Luminance uniformity engine 1001 further includes multiplier logic 1010 that receives the outputs of the front end LUT 1002 and the spatial attenuation array 1006 for each input level/x,y coordinate pair. The multiplier logic 1010 multiplies those outputs together and the resulting "corrected" input level, $n_i$, is supplied to the dither engine 1012, as indicated by arrow 1014, along with the corresponding pixel address information. The dither engine 1012 includes a dither array 1016, an addition logic circuit 1018, and a shift right (R) logic circuit or register 1020.

With this embodiment, the attenuation array, $a'_p$, described above in accordance with equation (18), is loaded into spatial attenuation array 1006. The remaining components of the run-time system 1000 are configured and operated in the manner described in application Ser. No. 10/612,309.

Image Pre-Warping

In addition to correcting the non-uniformity in luminance that results when the projector's optical axis is not perpendicular to the screen in at least one plane, the luminance correction engine 104 and/or the video controller 106 may be further configured to correct the geometric appearance of the projected image. That is, the luminance correction engine 104 may be configured to adjust the image being displayed on the screen so that it appears as a rectangle rather than a polygon, even though the projector's optical axis is not aligned perpendicularly with the screen.

Figure 11:
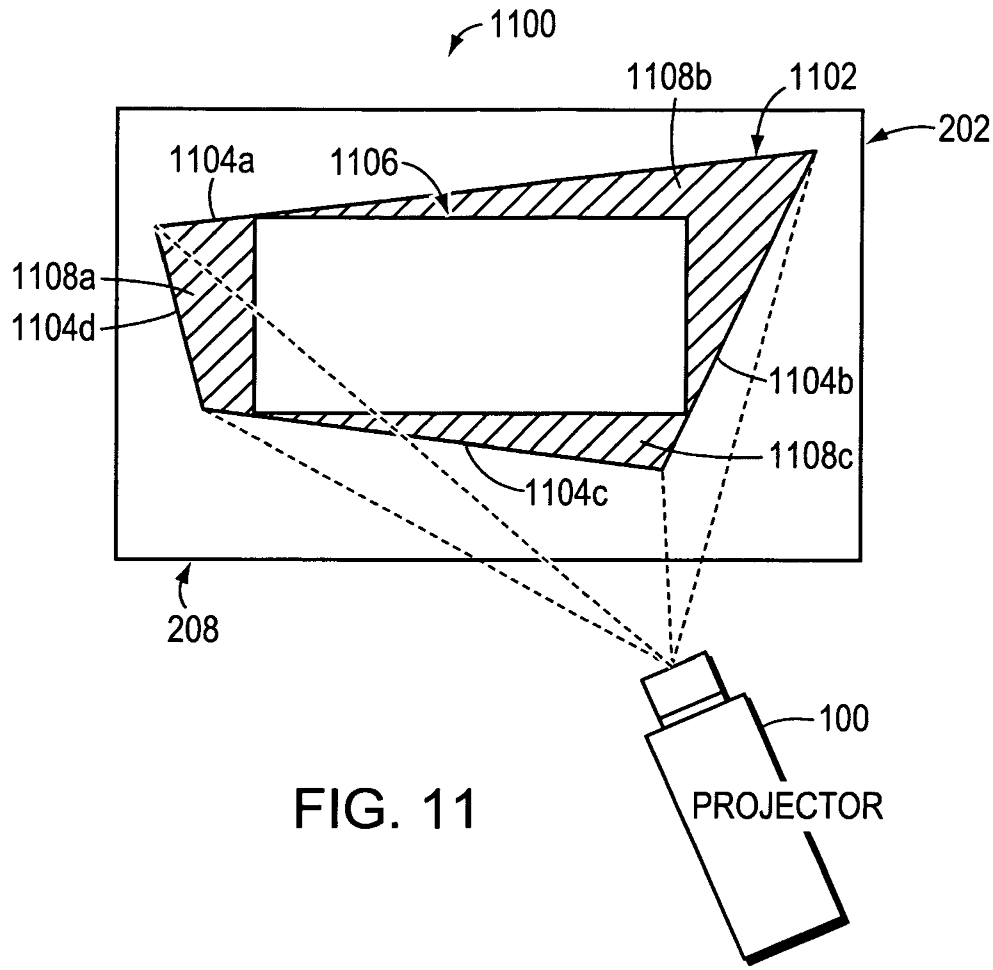

FIG. 11 is a highly schematic illustration of a projection arrangement 1100. Projection arrangement 1100 includes a projector, such as projector 100, and a screen 202 onto which an image 1102 from projector 100 is displayed. The screen image 1102 has four sides 1104*a–d*. In the illustrative projection arrangement 1100 of FIG. 11, the projector's optical axis (not shown) is not perpendicular to the screen 202. As a result, screen image 1102 is an oblique image, i.e., none of its opposing sides, i.e., 1104*a* and 1104*c*, and 1104*b* and 1104*d*, are parallel to each other. Within screen image 1102 is a subset image 1106 that corresponds to the geometrically corrected image that is to be displayed by projector 100. As shown, the preferred format of subset image 1106 is a rectangle. To generate the rectangular subset image 1106, those portions 1108*a–c* of screen image 1102 that fall outside of the subset image 1106, which are illustrated in FIG. 11 by hatched lines, are blanked-out, i.e., the pixels corresponding to those portions are turned off.

Figure 12:
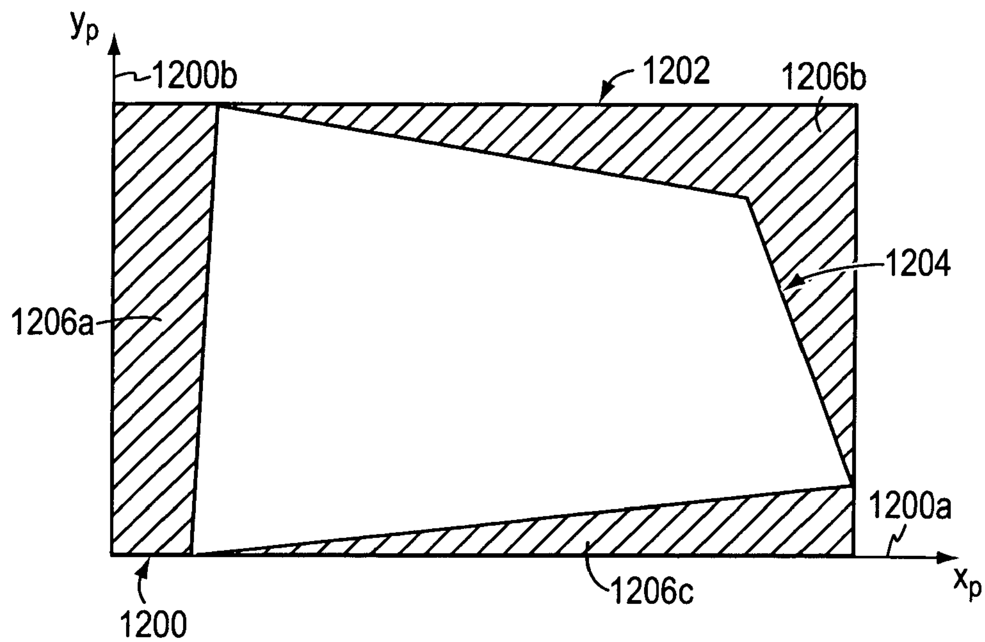

FIG. 12 is a highly schematic illustration of another projector coordinate system 1200 with reference to the projector 100 illustrated in FIG. 11. The projector coordinate system 1200 includes an x-axis, $x_p$, 1200*a* and a y-axis, $y_p$, 1200*b*. As described above, the projector coordinate system 1200 is perpendicular in all directions to the projector's optical axis. Accordingly, from the point of view of the projector 100, the image 1202 that is being generated by the projector 100 is a rectangle. Within image 1202 is a subset image 1204 that, when displayed onto screen 202 (FIG. 11), appears as corrected image 1106. Several regions, namely regions 1206*a–c*, which are illustrated in FIG. 12 by hatched lines, of the projector image 1202 fall outside of the subset image 1204. To cause corrected image 1106 to be displayed on screen 202, the luminance correction engine 104 and/or video controller 106 blanks out regions 1206_a–c_ of the projector image 1202.

A suitable technique for identifying the regions 1206_a–c_ of a projector image 1202 that are to be blanked out so as to produce a corrected, rectangular image 1106 is described in Sukthankar, R. et al. "Smarter presentations: exploiting homography in camera-projector systems" Proceedings of International Conference on Computer Vision (2001). This technique is preferably incorporated within either the luminance correction engine 104 and/or the video controller 106.

To conserve processor and memory resources, the run-time system 800 preferably skips over those pixels that fall within one of the blanked-out regions 1206_a–c_. In particular, a mask is generated that identifies those pixels that fall within the blanked-out regions 1206_a–c_. For example, those pixels that fall within subset image 1204 are assigned a value of binary "1", while those pixels that fall within a blanked-out region 1206_a–c_ are assigned a value of binary "0" within the mask. In response to receiving input image data, the run-time system 800 preferably checks whether the mask value of the respective pixel location is set to "0" or to "1". If the mask value is set to binary "0", then the run-time system 800 does not perform a look-up on the spatial attenuation array 802, and instead outputs a "0" luminance value for the respective pixel location, effectively turning the pixel location off. If the mask value is set to binary "1", the run-time system 800 performs a look-up on its attenuation array 802 and passes the retrieved attenuation value to the multiplier logic circuit 804 for generation of a "corrected" luminance value.

The foregoing description has been directed to specific embodiments of the present invention. It will be apparent, however, that other variations and modifications may be made to the described embodiments, with the attainment of some or all of their advantages. For example, the attenuation array, $a_o$, may be sub-sampled to reduce the overall size of the array. Therefore, it is the object of the appended claims to cover all such variations and modifications as come within the true spirit and scope of the invention.

The invention claimed is:

1. A method for correcting non-uniformity in luminance of an image generated by a projector and displayed obliquely on a screen having a surface, wherein the projector has a plurality of pixels for use in generating images and each projector pixel subtends to a corresponding projected area on the screen, the method comprising the steps of:

identifying, with a camera, the projector pixel that subtends to the largest projected area on the screen;

determining a ratio between the projected area of each pixel and the largest projected area;

organizing the ratio determined for each pixel into an attenuation array;

modifying luminance information of an input image received by the projector by the ratios of the attenuation array; and utilizing the modified luminance information to drive the projector such that the image produced on the screen is uniform in luminance.

2. The method of claim 1 further comprising the step of generating a homography that maps between a first coordinate system relative to the projector, and a second coordinate system relative to the surface, and wherein the step of identifying is based on the homography.

3. The method of claim 2 wherein the first coordinate system includes an $x_p$ coordinate and a $y_p$ coordinate;

the projector to surface homography includes parameters $h_7$, $h_8$ and $h_9$;

the step of identifying comprises the step of calculating a value, w, far each pixel represented by coordinates $x_p$, $y_p$, wherein w is equal to $|h_7x_p+h_8y_p+h_9|$ and determining which projector pixel has the smallest calculated value of w.

4. The method of claim 2 wherein the stop of generating the projector to surface homography comprises the steps of:

capturing one or more images produced by the projector on the screen with the camera;

determining the coordinates of each of at least four projector pixels in the first coordinate system, which is relative to the projector, and in a third coordinate system that is relative to the camera; and processing the coordinates of the at least four projector pixels in both the first and third coordinate systems to generate the projector to surface homography.

5. The method of claim 4 wherein the camera has an optical axis that is perpendicular with the surface in all planes, and the step of generating the projector to surface homography comprises the steps of:

generating a projector to camera homography based upon the determination of the coordinates of the at least four projector pixels in both the first and third coordinate systems; and equating the projector to camera homography with the projector to surface homography.

6. The method of claim 1 further comprising the step of positioning the camera substantially perpendicular to the surface of the screen, the camera and the projector having different optical axes relative to the surface of the screen.

7. A system for correcting luminance of an image displayed with an oblique shape on a screen having a surface, the system comprising:

a projector for generating the image, the projector having a non-perpendicular optical axis relative to the surface of the screen;

a camera for capturing the image, the camera having a substantially perpendicular optical axis relative to the surface of the screen;

a luminance correction engine for receiving the captured image from the camera, said luminance correction engine being configured to determine a ratio between a projected area of each pixel and the largest projected area on the screen, to organize the ratio determined for each pixel into an attenuation array, and to send the attenuation array to the projector, wherein the projector receives the attenuation or ray and modifies the luminance of the image.

8. The system of claim 7, wherein the attenuation array includes a first coordinate system representing the projector, a second coordinate system representing the surface, and a homography between the first coordinate system and the second coordinate system.

9. The system of claim 8, wherein the homography includes parameters $h_7$, $h_8$ and $h_9$ the first coordinate system includes an $x_p$ and a $y_p$ coordinate, and a value $|h_7x_p+h_8y_p+h_9|$.

10. The system of claim 7, wherein the luminance correction engine includes a spatial attenuation array for modifying the shape of the image.

11. An apparatus for correcting non-uniformity in luminance of an image generated by a projector and displayed obliquely on a screen having a surface, wherein the projector has a plurality of pixels for use in generating images and each projector pixel subtends to a corresponding projected area on the screen, the apparatus comprising:

means for capturing the image;

means for calculating an attenuation array based upon the captured image, wherein the means for calculating an attenuation array is configured to determine a ratio between the projected area of each pixel and the largest projected area on the screen to calculate the attenuation array;

means for modifying luminance information of an input image received by the projector by the attenuation array; and means for driving the projector with the modified luminance information such that the image produced on the screen is uniform in luminance.

12. The apparatus of claim 11, further comprising:

means for calculating homographies between the means for capturing, the screen, and the projector; and means for modifying a shape of the image based upon the homographies.

13. The apparatus of claim 11, further comprising:

means for identifying the projector pixel that subtends to the largest projected area on the screen; and means for organizing the ratio determined for each pixel into an array.

* * * * *

UNITED STATES PATENT AND TRADEMARK OFFICE

CERTIFICATE OF CORRECTION

PATENT NO. : 7,018,050 B2

APPLICATION NO. : 10/657527

DATED : March 28, 2006

INVENTOR(S) : Robert Alan Ulichney et al.

It is certified that error appears in the above-identified patent and that said Letters Patent is hereby corrected as shown below:

On Title Page, Item (57), under “ABSTRACT”, in column 2, line 7, delete “attends” and insert -- subtends --, therefor.

In column 3, line 58, after “type of” delete “is”.

In column 6, lines 1-7, delete “

$$\begin{bmatrix} x_c w \\ y_c w \\ w \end{bmatrix} = \begin{bmatrix} h_1 & h_2 & h_3 \\ h_4 & h_5 & h_6 \\ h_7 & h_8 & h_9 \end{bmatrix} \begin{bmatrix} x_p \\ y_p \\ 1 \end{bmatrix} \qquad (11)$$

” and insert

--

$$\begin{bmatrix} x_{p1} & y_{p1} & 1 & 0 & 0 & 0 & -x_{p1}x_{c1} & -y_{p1}x_{c1} & -x_{c1} \\ 0 & 0 & 0 & x_{c1} & y_{c1} & 1 & -x_{p1}y_{c1} & -y_{p1}y_{c1} & -y_{c1} \\ x_{p2} & y_{p2} & 1 & 0 & 0 & 0 & -x_{p2}x_{c2} & -y_{p2}x_{c2} & -x_{c2} \\ 0 & 0 & 0 & x_{c2} & y_{c2} & 1 & -x_{p2}y_{c2} & -y_{p2}y_{c2} & -y_{c2} \\ x_{p3} & y_{p3} & 1 & 0 & 0 & 0 & -x_{p3}x_{c3} & -y_{p3}x_{c3} & -x_{c3} \\ 0 & 0 & 0 & x_{c3} & y_{c3} & 1 & -x_{p3}y_{c3} & -y_{p3}y_{c3} & -y_{c3} \\ x_{p4} & y_{p4} & 1 & 0 & 0 & 0 & -x_{p4}x_{c4} & -y_{p4}x_{c4} & -x_{c4} \\ 0 & 0 & 0 & x_{c4} & y_{c4} & 1 & -x_{p4}y_{c4} & -y_{p4}y_{c4} & -y_{c4} \end{bmatrix} \begin{bmatrix} h_1 \\ h_2 \\ h_3 \\ h_4 \\ h_5 \\ h_6 \\ h_7 \\ h_8 \\ h_9 \end{bmatrix} = \begin{bmatrix} 0 \\ 0 \\ 0 \\ 0 \\ 0 \\ 0 \\ 0 \\ 0 \end{bmatrix}$$

--, therefor.

In column 6, lines 24-35, delete “

$$\begin{bmatrix} x_{p1} & y_{p1} & 1 & 0 & 0 & 0 & -x_{p1}x_{c1} & -y_{p1}x_{c1} & -x_{c1} \\ 0 & 0 & 0 & x_{c1} & y_{c1} & 1 & -x_{p1}y_{c1} & -y_{p1}y_{c1} & -y_{c1} \\ x_{p2} & y_{p2} & 1 & 0 & 0 & 0 & -x_{p2}x_{c2} & -y_{p2}x_{c2} & -x_{c2} \\ 0 & 0 & 0 & x_{c2} & y_{c2} & 1 & -x_{p2}y_{c2} & -y_{p2}y_{c2} & -y_{c2} \\ x_{p3} & y_{p3} & 1 & 0 & 0 & 0 & -x_{p3}x_{c3} & -y_{p3}x_{c3} & -x_{c3} \\ 0 & 0 & 0 & x_{c3} & y_{c3} & 1 & -x_{p3}y_{c3} & -y_{p3}y_{c3} & -y_{c3} \\ x_{p4} & y_{p4} & 1 & 0 & 0 & 0 & -x_{p4}x_{c4} & -y_{p4}x_{c4} & -x_{c4} \\ 0 & 0 & 0 & x_{c4} & y_{c4} & 1 & -x_{p4}y_{c4} & -y_{p4}y_{c4} & -y_{c4} \end{bmatrix} \begin{bmatrix} h_1 \\ h_2 \\ h_3 \\ h_4 \\ h_5 \\ h_6 \\ h_7 \\ h_8 \\ h_9 \end{bmatrix} = \begin{bmatrix} 0 \\ 0 \\ 0 \\ 0 \\ 0 \\ 0 \\ 0 \\ 0 \end{bmatrix}$$

” and insert --

$$\begin{bmatrix} x_c w \\ y_c w \\ w \end{bmatrix} = \begin{bmatrix} h_1 & h_2 & h_3 \\ h_4 & h_5 & h_6 \\ h_7 & h_8 & h_9 \end{bmatrix} \begin{bmatrix} x_p \\ y_p \\ 1 \end{bmatrix} \qquad (11)$$

--, therefor.

In column 14, line 4, in Claim 3, delete “far” and insert -- for --, therefor.

In column 14, line 8, in Claim 4, delete “stop” and insert -- step --, therefor.

In column 14, line 50, in Claim 7, delete “or ray” and insert -- array --, therefor.

Signed and Sealed this

Sixteenth Day of March, 2010

David J. Kappos

David J. Kappos
*Director of the United States Patent and Trademark Office*